No. 674,037. Patented May 14, 1901.
C. H. MONROE.
OSCILLATING STEAM ENGINE.
(Application filed Sept. 14, 1900.)
(No Model.) 2 Sheets—Sheet I.

WITNESSES:
A. N. Bonney.
B. W. Williams.

INVENTOR:
Charles H. Monroe.
by his Atty.
Henry W. Williams.

No. 674,037. Patented May 14, 1901.
C. H. MONROE.
OSCILLATING STEAM ENGINE.
(Application filed Sept. 14, 1900.)
(No Model.) 2 Sheets—Sheet 2.

WITNESSES
A. N. Bonney.
B. W. Williams

INVENTOR:
Charles H. Monroe,
by his Atty.
Henry W. Williams

THE NORRIS PETERS CO., PHOTO-LITHO., WASHINGTON, D. C.

derhead>UNITED STATES PATENT OFFICE.

CHARLES H. MONROE, OF SEARSPORT, MAINE, ASSIGNOR OF THREE-FOURTHS TO WILLIAM E. GRINNELL, OF SAME PLACE, AND HENRY B. BLACK, OF EVERETT, MASSACHUSETTS.

OSCILLATING STEAM-ENGINE.

SPECIFICATION forming part of Letters Patent No. 674,037, dated May 14, 1901.

Application filed September 14, 1900. Serial No. 30,050. (No model.)

*To all whom it may concern:*

Be it known that I, CHARLES H. MONROE, a citizen of the United States, residing at Searsport, in the county of Waldo and State of Maine, have invented new and useful Improvements in Steam-Engines for Automobiles, of which the following is a specification.

This invention relates to that class of automobiles in which steam is employed as a motive power; and it relates to the combination with or application to the automobile of a steam-engine provided with oscillating cylinders controlled by a valve and constructed substantially as below described, such construction having several advantages, prominent among which are great simplicity and cheapness and the obviation of the necessity for the employment of reversing mechanism.

The nature of the invention is fully described in detail below and illustrated in the accompanying drawings, in which—

Figure 1:
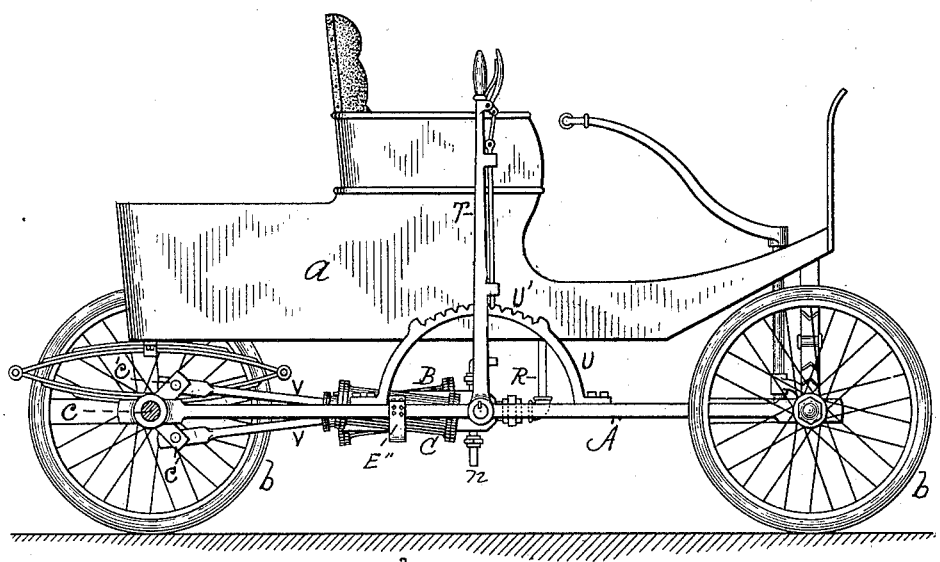
Figure 2:
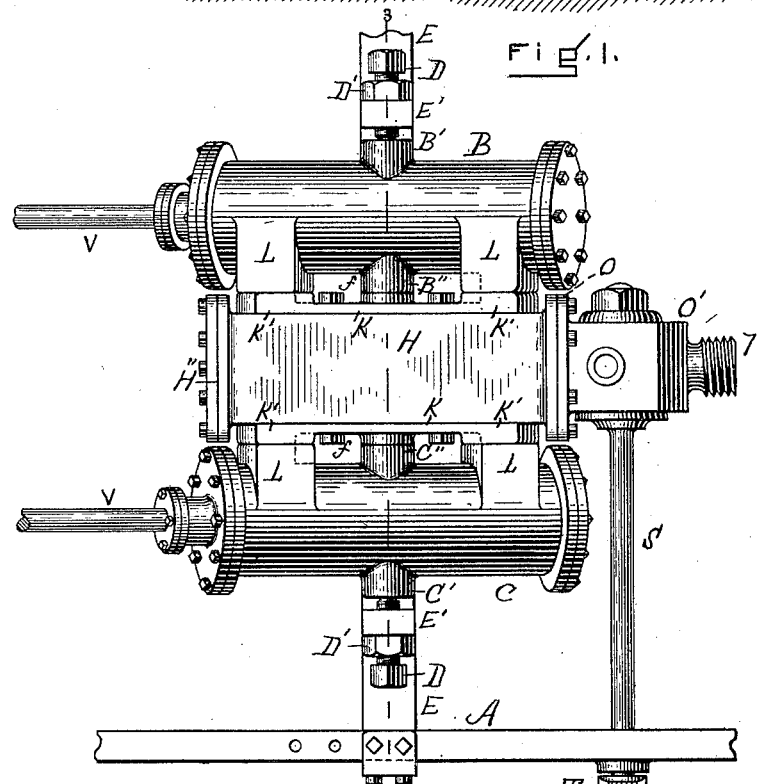
Figure 3:
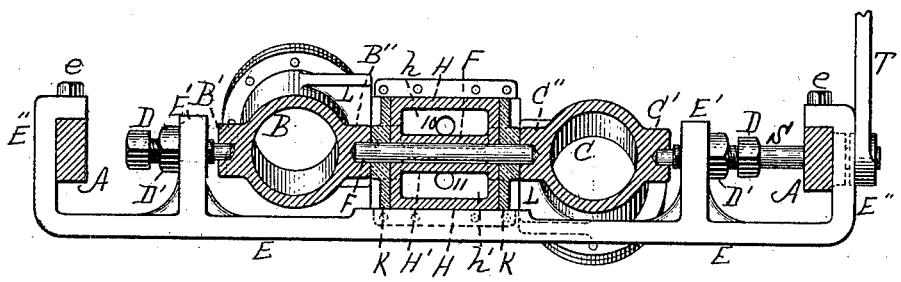
Figure 4:
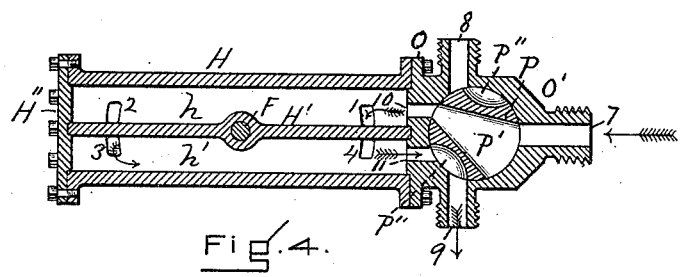
Figure 5:
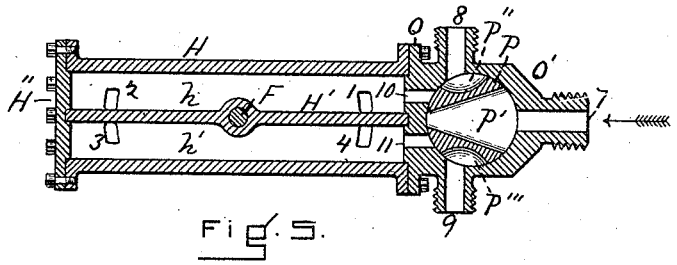
Figure 6:
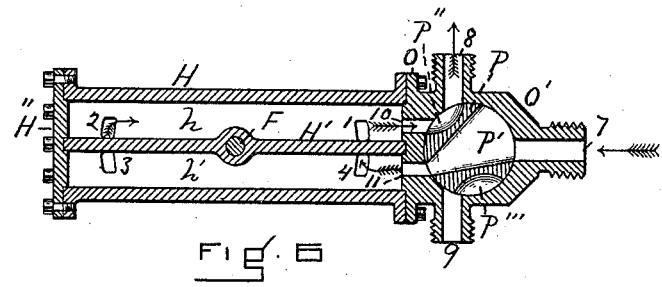
Figure 7:
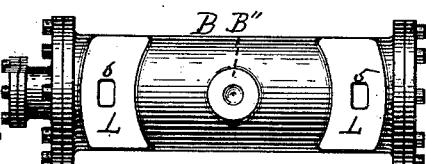

Figure 1 is a side elevation of an automobile embodying my invention. Fig. 2 is an enlarged plan view of the cylinders and steam-chest and sufficient connections to illustrate the invention. Fig. 3 is a vertical section taken on line 3, Fig. 2, looking forward—that is, toward the front of the vehicle. Fig. 4 is a central vertical section of the steam-chest and valve with the parts in the position assumed when the automobile is moving forward. Fig. 5 is a similar view with the parts in the position assumed when the automobile is not in motion. Fig. 6 is a similar view with the parts in the position assumed when the automobile is backing. Fig. 7 is a front elevation, or an elevation of the inner side of the farther cylinder looking at Fig. 1, and is exactly the same as would be a view in elevation of the nearer cylinder looking from the rear, the said cylinders being alike.

Similar characters of reference indicate corresponding parts.

*a* represents the body of the wagon or carriage, said body containing the ordinary tank and boiler.

*b b* represent the wheels, and *c* represents the rear axle, formed up into the usual cranks at *c'*.

A represents the frame, which is supported by the axles and which sustains the operating portions of the steam-engine.

B and C are reversely-oscillating cylinders whose trunnions B' C' are pivotally supported by the inner ends of the horizontal screws or bolts D, sustained by the uprights E', Figs. 2 and 3, which are integral with the frame E, which extends transversely across the vehicle under the body and is formed with upturned ends E'', whereby it is attached to and supported by the frame A. The screws or bolts D are provided with the ordinary nuts D', whereby the bolts may be horizontally adjusted, and the portions E'' of the transverse frame are secured to the frame A by suitable bolts *e*.

The inner sides of the cylinder are provided with suitable trunnions B'' C'', pivotally supported by the horizontal shaft or axle F, which is fast in the central horizontal partition H' of the steam-chest H. This steam-chest is provided with the end wall H'' and upper and lower chambers *h h'*, and its sides are flanked by brass plates K, bolted thereto, which bear against inwardly-projecting blocks L, extending from the cylinders, said plates K being formed up or thickened at K', so as to produce a bearing-surface, whereby allowance is made for wear, which can be taken up by the adjustable bolts D. The plates are secured to the sides of the chest by suitable bolts *f*. The side walls H''' of the steam-chest are each provided with the ports 1, 2, 3, and 4, the two former opening from the chamber *h* and the two latter from the chamber *h'*, the ports 1 and 4 being adapted to coincide alternately with the ports 5 in the cylinders B C, Fig. 7, and the ports 2 and 3 being adapted to coincide alternately with the ports 6 in said cylinders. Bolted to the front end of the steam-chest is a plate O, formed up into the head O', which contains the valve P. This tubular head is provided with the steam-inlet passage 7, which is connected by the feed-pipe R with the boiler, the passages 8 and 9, which serve alternately as exhausts, and the passages 10 and 11, which connect, respectively, with the chambers *h* and *h'* in the steam-chest. The valve P is provided with the cone-shaped passage P' and the opposite peripheral passages or recesses P'' and P'''. This valve is provided with the horizontal stem S, which has its bearings in the frame A and has secured to its outer end the operating-lever T, which is adapted to be actuated in the ordinary manner by the driver and to be engaged in the usual way in suitable notches U' in the arc-shaped frame U, bolted to the frame A. The exhaust-passages 8 and 9 are preferably provided with suitable downwardly-extending exhaust-pipes n. The cylinders are of course furnished with suitable pistons, which are connected by piston-rods V with the cranks c' on the rear axle c.

In operation when the lever T is swung forward the valve is rotated by means of its stem S into the position indicated in Fig. 4. The conical passage P' in the valve then coincides with the steam-inlet 7 and the passage 10, and the steam passes through said inlet 7, passage P', and passage 10 into the chamber h, thence through the port 1 in the steam-chest into the cylinder B, through the port 5, and through the port 6 in the cylinder and port 3 in the steam-chest into the exhaust-chamber h' and out through the port 11, passage P'''', and exhaust 9, thus driving the automobile forward. Alternately with the cylinder B the cylinder C brings its ports 5 and 6 into coincidence with the ports 1 and 3 on the opposite side of the steam-chest, and the steam passes through said cylinder C and exhausts in exactly the same manner, the chamber h being the steam-chamber and h' being the exhaust-chamber. When the automobile is to be backed, the lever a is swung rearward, bringing the valve P into the position indicated in Fig. 6. The steam then passes through the inlet 7, passage P', and port 11 into the chamber h' and thence through the port 4 and port 5 into the cylinder B and through the port 6 and port 2 into the chamber h (which is now the exhaust-chamber) and out through the port 10, passage P''', and exhaust 8. The cylinders B and C are of course operated alternately through the ports on the opposite sides of the steam-chest. When the carriage is to be stopped, the lever is placed in the vertical position indicated in Fig. 1, and the valve is in the position shown in Fig. 5. When the valve is in such position, the passage P' is not in coincidence with either of the ports 10 and 11, and the passages P'' P''' are out of coincidence with said ports. Hence no steam enters the chest.

The soft-metal plates K, provided with the thickened portions or cheeks K', whose entire surfaces are in contact with the projecting blocks L, are effective in preventing leakage from the ports 1, 2, 3, and 4 in the steam-chest and 5 and 6 in the cylinders.

Having thus fully described my invention, what I claim, and desire to secure by Letters Patent, is—

1. In an automobile of the character described, the oscillating cylinders B, C supported by a suitable frame; the steam-chest H provided with the chambers h, h' and supported between the cylinders, said cylinders being provided with the ports 5 and 6, and said steam-chest being provided with the ports 1, 2, 3 and 4 equally divided between said chambers and adapted to coincide with the ports 5 and 6; the plate O formed with the head or socket O' provided with the inlet-passage 7, the exhaust-passages 8 and 9 and the ports 10 and 11; the valve P provided with the substantially conical passage P' and the peripheral passages P'' and P'''; and an actuating-lever operating to rotate said valve and thereby bring the passage P' into coincidence with the passage 7 and port 10 or passage 7 and port 11 and simultaneously bring the passages P''', P'' respectively into coincidence with the passage 9 and port 11 or passage 8 and port 10, or to rotate the valve into a position in which the ports or passages into the steam-chest are closed for the purpose of driving forward or backward the vehicle or of stopping it, substantially as set forth.

2. In an automobile of the character described, the stationary steam-chest H; the soft-metal plates K bolted to the opposite sides of said steam-chest, said plates being formed with the thickened portions or cheeks K', and ports being formed in the side walls of the chest and extending through the thickened portions of said plates; the oscillating cylinders B, C supported on opposite sides of the steam-chest and provided with the inwardly-extending blocks L bearing against the thickened portions or cheeks K', said cylinders being provided with ports extending through the projections L and adapted to coincide with the ports in the steam-chest; and a valve adapted to admit steam into the steam-chest from which it is admitted into the cylinders alternately by the movement of said cylinders, substantially as described.

CHARLES H. MONROE.

Witnesses:
WILLIAM M. PARSE,
ALEXANDER H. NICHOLS.